United States Patent Office 3,324,064
Patented June 6, 1967

3,324,064
AQUEOUS DISPERSIONS OF VINYLIDENE CHLORIDE - ACRYLATE - VINYLSULFONIC ACID COPOLYMERS
Hans Fikentscher, Bad Durkheim, and Karl Herrle, Ludwigshafen (Rhine), Germany, assignors to Badische Anilin- & Soda-Fabrik Aktiengesellschaft, Ludwigshafen (Rhine), Germany
No Drawing. Filed June 16, 1965, Ser. No. 464,540
Claims priority, application Germany, Apr. 1, 1959,
B 52,684
4 Claims. (Cl. 260—29.6)

This application is a continuation-in-part of our application Ser. No. 19,164, filed Apr. 1, 1960, now abandoned.

This invention relates to a process for the production of stable aqueous dispersions on the basis of vinylidene chloride.

Aqueous dispersions of polymers and copolymers are used in practice for many purposes. The properties required of these dispersions and claims made thereon depend on the nature of their composition and the purpose for which they are intended.

For coating textiles or paper or products similar to paper, dispersions of copolymers are used which contain a high proportion of vinylidene chloride. These dispersions consist for example of copolymers of vinylidene chloride and acrylic acid esters. The proportion of vinylidene chloride in the copolymer should on the one hand be as high as possible in order to be able to produce from these aqueous dispersions films which are impermeable not only to oil and aromas but also to water vapor. On the other hand, by reason of the high crystallinity of copolymers containing vinylidene chloride, the vinylidene chloride content must not exceed a definite upper limit. This limit varies according to the nature of the comonomers and in the most favorable case is about 90% or slightly more.

Aqueous dispersions of copolymers of vinylidene chloride and other polymerizable compounds such as esters of acrylic acid should have a variety of properties. It should be possible to store the dispersions for practically unlimited periods; in other words, they should not settle, thicken or coagulate even after prolonged standing. Stability must also be guaranteed when fluctuations of temperature occur, for example during prolonged storage and in the transport of such dispersions.

Since the dispersions are to be used for coating purposes, they must have good film-forming properties. This film-forming capacity must not decline even after prolonged storage, i.e. the copolymers must be present in an amorphous state and must not crystallize out in the aqueous dispersion. Furthermore, the dispersions should be compatible with pigments without coagulation or sedimentation occurring upon the addition of pigments. They must be colorless and should not discolor either on prolonged standing or when subsequently worked up. Finally, the dispersions must remain stable when worked up, for example on coating apparatus, when stirred, for example with pigments, or when mixed with other dispersions.

Coatings prepared with the emulsions should be as soft and supple as possible and must seal well. On the other hand they must not be sticky and must not block when stored under pressure, for example when large quantities are piled on top of one another. Furthermore, they must be odorless and colorless. They must not decompose or discolor even at the high temperatures used for sealing.

It is known that film-forming polymers can be improved as regards flexibility and good film-forming capacity by the co-employment of small amounts of softeners. Since the softener readily exudes and often migrates into the goods packed in the coated paper, however, coatings with vinylidene chloride polymers which come into contact with foodstuffs must be free of softeners.

These many requirements have meant that in the production of aqueous dispersions of copolymers with a high proportion of vinylidene chloride it has always been necessary to arrive at a compromise and, by appropriate measures, to achieve only some of the desired properties.

We have now found that stable aqueous dispersions on the basis of vinylidene chloride are obtained by polymerizing 60 to 92% by weight of vinylidene chloride, 8 to 40% by weight of an ester of acrylic or methacrylic acid with an alcohol containing 1 to 8 carbon atoms, and 0.1 to 2% by weight of vinylsulfonic acid or a water-soluble salt thereof in the presence of an emulsifier.

The proportion of vinylidene chloride should be from about 60 to 92% by weight. It is preferably between about 80 and 91% by weight. Esters of acrylic or methacrylic acid with alcohols, preferably alkanols, containing 1 to 8 carbon atoms are copolymerized with the vinylidene chloride. Esters of this kind are for example methyl acrylate, butyl acrylate, ethylhexyl acrylate, or the corresponding methacrylates. When methacrylic acid esters are used, the polymer dispersions obtained produce somewhat harder coatings than when acrylic acid esters are used. The acrylic or methacrylic acid esters are copolymerized with the vinylidene chloride in amounts between about 8 and 40% by weight. Mixtures of various acrylic acid and/or methacrylic acid esters may be used and the properties, especially the hardness, of the films or coatings to be prepared from the aqueous dispersions can be varied thereby.

With the vinylidene chloride and the acrylic or methacrylic acid esters there are also polymerized small amounts, i.e. about 0.1 to 2% by weight, of water-soluble salts of vinyl sulfonic acid. For this purpose the alkali or alkaline earth salts or the ammonium salt of vinylsulfonic acid are most suitable. It is also possible however to use free vinylsulfonic acid.

As emulsifier there are used about 1 to 2% by weight of a commercial emulsifier. Paraffinsulfonic acids, as for example the alkali salts of paraffinsulfonic acids with 12 to 24 carbon atoms, have proved especially suitable.

Polymerization catalysts may be used in the process of the present invention in the usual amounts, i.e. between about 0.01 and 1% by weight. The preferred catalysts are water-soluble radical-forming compounds, as for example sodium or potassium persulfate, or hydrogen peroxide, or also azo compounds. Reducing substances, such as ascorbic acid or sodium hyposulfite, may also be present.

The polymerization is carried out at temperatures between about 35° and 70° C. To regulate the pH range, buffer substances may be used, preferably phosphates, such as primary or secondary sodium or potassium phosphate, sodium pyrophosphate, sodium acetate and the like. The pH range during the polymerization should as far as possible lie between 5 and 6.

It is often preferable for only a part of the emulsifier to be present at the beginning of the polymerization, and for further emulsifier to be added to the polymerization mixture at the rate at which the polymerization proceeds. The surface tension should be far as possible lie below 35 during the polymerization. After the end of the polymerization, it is preferable to add to the aqueous dispersion of the copolymers a further small amount of the emulsifier, for example 0.5 to 1% by weight as an additional stabilization measure.

Besides the vinylidene chloride, acrylic or methacrylic acid esters and vinylsulfonic acid or salt thereof used in every case for the polymerization, it is also possible to copolymerize therewith small amounts, e.g. 1 to about 5% by weight of other polymerizable unsaturated monomeric compounds in order to obtain certain specific properties.

In many cases it is advantageous, for example, to introduce into the copolymer up to about 2% by weight of alpha, beta-unsaturated carboxylic acids or carboxylic acid amides, as for example acrylic acid or acrylamide. Vinyl chloride or acrylonitrile may also be copolymerized in small amounts, but the proportion of these compounds should not exceed 5% by weight.

The aqueous dispersions of the copolymers are characterized by high stability in storage. They are especially suitable for coating paper or paper-like products or textiles.

The following examples will further illustrate this invention but the invention is not restricted to these examples. The parts are parts by weight.

EXAMPLE 1

320 parts of water, 8 parts of sodium paraffinsulfonate with a carbon chain length of 12 to 18, 1.6 parts of sodium pyrophosphate, 2 parts of sodium vinylsulfonate and 1.2 parts of acrylamide are placed in a stirring vessel. The pH of the mixture is adjusted to 6 by adding small amounts of phosphoric acid. Then 60 parts of ethyl acrylate and 340 parts of vinylidene chloride are added. After the air has been expelled with nitrogen, 1.2 parts of potassium persulfate dissolved in 20 parts of water are added and the mixture polymerized for about 20 hours at 45° C.

A stable about 55% emulsion is obtained which, when used for example for coating paper, gives a soft, non-sticky, flexible film.

EXAMPLE 2

380 parts of water, 8 parts of sodium paraffinsulfonate with a carbon chain length of 12 to 18, 1.6 parts of sodium pyrophosphate, 3 parts of sodium vinylsulfonate and 2 parts of acrylic acid are placed in a stirring vessel. The pH of the mixture is adjusted to 6 by adding a small amount of phosphoric acid. 32 parts of methyl acrylate and 368 parts of vinylidene chloride are added thereto. After the air has been displaced by nitrogen, there are added 1.2 parts of potassium persulfate dissolved in 20 parts of water and the mixture is polymerized for about 20 hours at 50° C. As soon as the polymerization is ended, another 4 parts of the emulsifier are added to the aqueous emulsion. The about 50% emulsion obtained is especially well suited for the production of non-blocking coatings on paper which are capable of being hot-sealed.

EXAMPLE 3

380 parts of water, 8 parts of sodium paraffinsulfonate with a carbon chain length of 16 to 24, 3 parts of acrylic acid, 1.6 parts of sodium acetate and 4 parts of sodium vinylsulfonate are placed in a stirring vessel and the pH of the mixture adjusted to 6 by adding a small amount of acetic acid. Then 40 parts of butyl acrylate, 20 parts of vinyl chloride and 340 parts of vinylidene chloride are added thereto.

After the air in the vessel has been expelled by means of nitrogen, 1.2 parts of potassium persulfate dissolved in 20 parts of water are added and the mixture polymerized for about 20 hours at 55° C. To the polymerized about 50% emulsion there are added another 2 parts of the emulsifier.

The stable emulsion obtained is especially suitable for coating cardboard.

EXAMPLE 4

100 parts of a mixture of vinylidene chloride and methyl acrylate are emulsified in a solution of 2.5 parts of sodium paraffinsulfonate ($C_{12}$ to $C_{18}$), 0.5 part of potassium persulfate and 1 part of sodium vinylsulfonate in 100 parts of water and the emulsion is fed into a shaking autoclave. By forcing in nitrogen several times and decompressing the oxygen is removed. The emulsion is then polymerized at 50° C. until, as a manometer indicates, a vacuum is set up after about 15 hours. The pH value at the beginning of the polymerization was 5.8 and after the polymerization 4.2.

The emulsions obtained have an extended potlife and are practically free of coagulated matter. On drying faintly opaque colorless films are obtained. In dependency on the mixing ratio in the monomer mixture the softening temperature of the polymer is as follows:

| Composition of the monomer mixture | | Softening temperature, ° C. | |
|---|---|---|---|
| Vinylidene chloride in parts | Methyl acrylate in parts | Unshelved | Shelved at 50° C. for 24 hours |
| 60 | 40 | 45 | 45 |
| 70 | 30 | 41 | 41 |
| 80 | 20 | 31 | 31 |
| 85 | 15 | 20 | 20 |
| 90 | 10 | 18 | 15 |
| 92 | 8 | 12 | 25 |

EXAMPLE 5

When ethyl acrylate is used as the comonomer in the preparation of a polymer by the method according to Example 4, the softening points of the polymer obtained are as set out in the following table:

| Composition of the monomer mixture | | Softening temperature, ° C. | |
|---|---|---|---|
| Vinylidene chloride in parts | Methyl acrylate in parts | Unshelved | Shelved at 50° C. for 24 hours |
| 60 | 40 | 21 | 21 |
| 70 | 30 | 21 | 21 |
| 80 | 20 | 18 | 18 |
| 85 | 15 | 14 | 13 |
| 90 | 10 | 8 | 25 |
| 92 | 8 | 5 | 32 |

EXAMPLE 6

When butyl acrylate is used as the comonomer in the preparation of a polymer by the method according to Example 4, the softening points of the polymer obtained are set out in the following table:

| Composition of the monomer mixture | | Softening temperature, ° C. | |
|---|---|---|---|
| Vinylidene chloride in parts | Methyl acrylate in parts | Unshelved | Shelved at 50° C. for 24 hours |
| 60 | 40 | ±0 | ±0 |
| 70 | 30 | −2 | 2 |
| 80 | 20 | −2 | 1 |
| 85 | 15 | −5 | 10 |
| 90 | 10 | −8 | 22 |
| 92 | 8 | −10 | 35 |

EXAMPLE 7

When 2-ethylhexyl acrylate is used as the comonomer in the preparation of a polymer by the method according to Example 4, the softening points of the polymer obtained are set out in the following table:

| Composition of the monomer mixture | | Softening temperature, °C. | |
|---|---|---|---|
| Vinylidene chloride in parts | Methyl acrylate in parts | Unshelved | Shelved at 50° C. for 24 hours |
| 60 | 40 | −10 | −10 |
| 70 | 30 | −7 | ±0 |
| 80 | 20 | −8 | 10 |
| 85 | 15 | −10 | 30 |
| 90 | 10 | −11 | 58 |
| 92 | 8 | −11 | 80 |

EXAMPLE 8

A polymer is prepared by the method of Example 4 using methyl methacrylate as the comonomer. The emulsions prepared with the said polymer do not form films at room temperature. The solid polymer obtained was therefore made into moldings at 150° C. for testing purposes. The softening points of the test moldings are set out in the following table:

| Composition of the monomer mixture | | Softening temperature, °C. | |
|---|---|---|---|
| Vinylidene chloride in parts | Methyl acrylate in parts | Unshelved | Shelved at 50° C. for 24 hours |
| 60 | 40 | 66 | 66 |
| 70 | 30 | 53 | 53 |
| 80 | 20 | 45 | 45 |
| 85 | 15 | 40 | 45 |
| 90 | 10 | 38 | 48 |
| 92 | 8 | 30 | 54 |

EXAMPLE 9

Sodium vinylsulfonate is added in varying amounts to a solution each time of 2 parts of paraffinsulfonate, 0.3 part of potassium persulfate and 0.4 part of sodium pyrophosphate in 100 parts of water which has been set to pH 6 with phosphoric acid. To each mixture thus prepared there are added 80 parts of vinylidene chloride and 20 parts of ethyl acrylate. The various mixtures are each put into a stirring autoclave, flushed with nitrogen and polymerized at 55° C.

The 50 percent aqueous dispersions of the polymer are tested for this viscosity (2 mm. Ford measuring cup), their stability to stirring (high-speed stirrer) and their compatibility with kaolin (10 parts of kaolin to 20 parts of dispersion). The result of the tests are set out in the following table:

| Sodium vinylsulfonate, percent | Viscosity, sec. | Stability to stirring, sec. | Compatibility with kaolin |
|---|---|---|---|
| 0 | 63 | 120 | Coagulates. |
| 0.1 | 58 | 130 | Do. |
| 0.2 | 55 | 140 | Do. |
| 0.5 | 53 | 180 | Good. |
| 1 | 52 | 200 | Do. |
| 2 | 45 | 270 | Do. |

EXAMPLE 10

Solutions of 3 parts of alkylarylsulfonate, 0.5 part of secondary sodium phosphate, 0.4 part of sodium persulfate, 70 parts of vinylidene chloride, 30 parts of butyl acrylate, 0.2 part of sodium vinylsulfonate, 0.5 part of acrylic acid and varying amounts of acrylamide in 100 parts of water are emulsified, set to pH 6 with phosphoric acid and polymerized at 60° C. in the manner described in Example 9.

The aqueous dispersions obtained in a concentration of 50% are stable to stirring for more than 6 minutes and compatible with kaolin. The viscosity is set out in the following table:

| Acrylamide, percent | Viscosity, sec. (2 mm. Ford measuring cup) |
|---|---|
| 0 | 62 |
| 0.2 | 64 |
| 0.5 | 66 |
| 1 | 150 |
| 2 | (¹) |

¹ Too viscous, not measurable.

EXAMPLE 11

A solution of 1 part of sodium paraffinsulfonate, 0.5 part of potassium persulfate, 90 parts of vinylidene chloride, 10 parts of methyl methacrylate, 0.1 part of sodium vinylsulfonate, 0.3 part of monobutyl maleate in 100 parts of water is heated to 35° C., while stirring, in a glass flask fitted with a reflux cooler and a stirrer. The monomer emulsion has added to it, in the course of 5 hours, a solution of 0.5 part of sodium sulfoxylate and 2 parts of sodium paraffinsulfonate in 10 parts of water. Polymerization occurs.

The dispersion obtained has the pH 3. It can be used as a weatherproofing agent for cellophane.

We claim:

1. In a process for the production of stable aqueous dispersions of vinylidene chloride copolymers in which a reaction mixture containing vinylidene chloride and an ester of an acid selected from the group consisting of acrylic acid and methacrylic acid and an alkanol containing from 1 to 8 carbon atoms are copolymerized in the presence of an emulsifier and a polymerization catalyst, the improvement which comprises: copolymerizing with said vinylidene chloride and said ester a water-soluble compound selected from the group consisting of vinylsulfonic acid and water-soluble salts of vinylsulfonic acid, said reaction mixture containing 60 to 92 parts by weight of vinylidene chloride, 8 to 40 parts by weight of said ester and 0.1% to 2% by weight of said water-soluble compound based on the combined weight of said vinylidene chloride and said ester; said copolymerization being carried out at a temperature between about 35° C. and 70° C. and at a pH of from about 5 to 6.

2. In a process for the production of stable aqueous dispersions of vinylidene chloride copolymers in which a reaction mixture containing vinylidene chloride and an ester of an acid selected from the group consisting of acrylic acid and methacrylic acid and an alkanol containing from 1 to 8 carbon atoms are copolymerized in the presence of an emulsifier and a polymerization catalyst, the improvement which comprises: copolymerizing with said vinylidene chloride and said ester a water-soluble compound selected from the group consisting of vinylsulfonic acid and water-soluble salts of vinylsulfonic acid, said reaction mixture containing 80 to 91 parts by weight of vinylidene chloride, 9 to 20 parts by weight of said ester and 0.1% to 2% by weight of said water-soluble compound based on the combined weight of said vinylidene chloride and said ester; said copolymerization being carried out at a temperature between about 35° C. and 70° C. and at a pH from about 5 to 6.

3. A stable aqueous polymeric dispersion which comprises: 60 to 92 parts by weight of polymerized vinylidene chloride, 8 to 40 parts by weight of a polymerized ester of an alkanol containing from 1 to 8 carbon atoms and an acid selected from the group consisting of acrylic and methacrylic acid and 0.1% to 2% by weight based on the combined weight of said polymerized vinylidene chloride and said polymerized ester of a polymerized compound selected from the group consisting of free vinylsulfonic acid and a water-soluble salt of a vinylsulfonic acid, said polymeric dispersion having a pH value of between 4 and 6.

4. A stable aqueous polymeric dispersion which comprises: 80 to 91 parts by weight of polymerized vinylidene chloride, 9 to 20 parts by weight of a polymerized ester of an alkanol containing from 1 to 8 carbon atoms and an acid selected from the group consisting of acrylic acid and methacrylic acid and 0.1% to 2% by weight based on the combined weight of said polymerized vinylidene chloride and said polymerized ester of a polymerized compound selected from the group consisting of free vinylsulfonic acid and a water-soluble salt of a vinylsulfonic acid, said polymeric dispersion having a pH value of between 4 and 6.

References Cited
UNITED STATES PATENTS

| | | | |
|---|---|---|---|
| 2,300,920 | 11/1942 | Heuer | 260—29.6 |
| 2,829,068 | 4/1958 | Stewart | 260—87.7 |
| 2,914,499 | 11/1959 | Sheetz | 260—29.6 |

SAMUEL H. BLECH, *Primary Examiner.*

MURRAY TILLMAN, *Examiner.*

J. ZIEGLER, *Assistant Examiner.*

UNITED STATES PATENT OFFICE
CERTIFICATE OF CORRECTION

Patent No. 3,324,064                                              June 6, 1967

Hans Fikentscher et al.

It is hereby certified that error appears in the above numbered patent requiring correction and that the said Letters Patent should read as corrected below.

Column 4, in the table of EXAMPLE 5, sub-heading to the second column, line 1 thereof, for "Methyl" read -- Ethyl --; same column 4, in the table of EXAMPLE 6, sub-heading to the second column, line 1 thereof, for "Methyl" read -- Butyl --; column 5, in the table of EXAMPLE 7, sub-heading to the second column, line 1 thereof, for "Methyl" read -- 2 Ethylhexyl --; same column 5, in the table of EXAMPLE 8, sub-heading to the second column, line 1 thereof, for "Methyl" read -- Methyl meth- --.

Signed and sealed this 5th day of November 1968.

(SEAL)

Attest:

Edward M. Fletcher, Jr.                                    EDWARD J. BRENNER

Attesting Officer                                                Commissioner of Patents